United States Patent
Mannella et al.

(10) Patent No.: US 11,519,813 B2
(45) Date of Patent: Dec. 6, 2022

(54) METHOD FOR PRESSURIZED LEAK TESTING

(71) Applicant: ADVANCED PRESSURE TECHNOLOGY, Napa, CA (US)

(72) Inventors: Gregory John Mannella, Petaluma, CA (US); Christopher Neil Meyer, Petaluma, CA (US)

(73) Assignee: ADVANCED PRESSURE TECHNOLOGY, Napa, CA (US)

( * ) Notice: Subject to any disclaimer, the term of this patent is extended or adjusted under 35 U.S.C. 154(b) by 478 days.

(21) Appl. No.: 16/535,798

(22) Filed: Aug. 8, 2019

(65) Prior Publication Data

US 2021/0041325 A1 Feb. 11, 2021

(51) Int. Cl.
*G01M 3/28* (2006.01)
*F17D 5/02* (2006.01)
*G01M 3/22* (2006.01)

(52) U.S. Cl.
CPC ............ *G01M 3/2861* (2013.01); *F17D 5/02* (2013.01); *G01M 3/22* (2013.01)

(58) Field of Classification Search
CPC .... G01M 3/2861; G01M 3/222; G01M 3/224; G01M 3/223; G01M 3/225
See application file for complete search history.

(56) References Cited

U.S. PATENT DOCUMENTS

| | | | | |
|---|---|---|---|---|
| 2,255,921 A | * | 9/1941 | Fear | G01M 3/2853 73/46 |
| 2,703,978 A | * | 3/1955 | Baxter | G01N 3/00 73/40.7 |
| 3,034,338 A | * | 5/1962 | Snyder | G01M 3/223 73/40.7 |
| 3,842,659 A | * | 10/1974 | Bacroix | G01M 3/222 73/40.7 |
| 4,282,743 A | * | 8/1981 | Pickett | G01M 3/223 73/40.7 |
| 4,918,975 A | * | 4/1990 | Voss | G01M 3/202 73/40.7 |
| 4,953,826 A | * | 9/1990 | Ohmi | F16K 7/16 137/550 |

(Continued)

FOREIGN PATENT DOCUMENTS

| | | | |
|---|---|---|---|
| KR | 206071139 | * 6/2006 | |
| WO | WO-2015169569 A1 | * 11/2015 | ............ G01M 3/223 |

OTHER PUBLICATIONS

Advanced Pressure Technology, "Pressurized Inboard Leak Testing," Test Report #30016571, Apr. 9, 2019, 8 pages.

(Continued)

*Primary Examiner* — Daniel S Larkin
(74) *Attorney, Agent, or Firm* — Birch, Stewart, Kolasch & Birch, LLP (57) ABSTRACT

A method for testing a device under test includes the steps of applying a vacuum to an interior of the device under test. Pressurizing a predetermined portion on an exterior of the device under test with helium to detect a potential pressure leak. Utilizing a large pressure differential during the exterior testing of the device under test as compared to the vacuum applied during to the interior of the device under test. Detecting a potential leak in the device under test while leaving no residual helium in a wetted area of the device under test.

2 Claims, 6 Drawing Sheets

(56) References Cited

U.S. PATENT DOCUMENTS

| | | | | |
|---|---|---|---|---|
| 5,131,425 | A * | 7/1992 | Sturgis | G05D 16/0683 |
| | | | | 137/116.5 |
| 5,163,468 | A * | 11/1992 | Robinson | F02M 69/54 |
| | | | | 123/463 |
| 5,168,749 | A * | 12/1992 | Nugent | G01M 1/12 |
| | | | | 73/65.04 |
| 5,172,583 | A * | 12/1992 | Tallon | G01M 3/202 |
| | | | | 73/40.7 |
| 5,191,870 | A * | 3/1993 | Cook | F02M 25/0809 |
| | | | | 123/198 D |
| 6,681,615 | B1 * | 1/2004 | Svanberg | G01M 3/2807 |
| | | | | 73/40 |
| 2003/0154768 | A1 * | 8/2003 | Shioya | G01M 3/223 |
| | | | | 73/40.7 |
| 2008/0307858 | A1 * | 12/2008 | McManus | G01M 3/226 |
| | | | | 73/1.01 |
| 2014/0352408 | A1 * | 12/2014 | Tharaldson | G05B 23/0256 |
| | | | | 73/46 |

OTHER PUBLICATIONS

Dr. Graham Rogers, "Leak detection techniques Helium Leak Testing Techniques for Industry," Dec. 2012, 19 pages.

John Sprovieri, "Helium-Based Leak Testing," https://www.assemblymag.com/articles/87545-helium-based-leak-testing, Apr. 29, 2010, 6 pages.

* cited by examiner

METHOD FOR PRESSURIZED LEAK TESTING

BACKGROUND OF THE INVENTION

Field of the Invention

The present invention is directed to a method for detecting a leak wherein a device under test is connected to a leak detector with a vacuum applied inside the device under test and helium under pressure is applied to a specific predetermined area outside the device under test.

Description of Background Art

No testing device is truly completely helium leak tight. All testing devices leak to some degree. Four main leak test methods are typically used to test leak integrity of high purity (HP) and ultra high purity (UHP) gas delivery devices:
1. pressure decay,
2. inboard helium,
3. outboard helium sniffer probe, and
4. outboard helium bell jar.

Each of the above leak test methods has advantages and disadvantages. Realistically, the leak test methods identified above establish the leak integrity of the device under test or system under test rather than to provide a given leak rate per se.

Pressure Decay

The most common method of leak testing in general is a simple pressure test with nitrogen. Valves and pressure measurement devices are attached to the device under test to enable pressurization with the device under test in the fully open position and pressure monitoring state. The trapped volume, time and pressure differential determine the test sensitivity to detect leaks. Testing with the least volume and the longest time provides the greatest sensitivity. A common name for this test is a nitrogen static pressure decay test. A 24 hour static pressure decay test is a common final leak check for a piping installation.

Inboard Helium Leak Test

An inboard helium leak testing is the single most common helium leak testing method. The device under test is connected to a helium leak detector (mass spectrometer), all other ports are capped, the device under test is adjusted to the fully open position and the leak detector applies vacuum to the inside (wetted area) of the device under test. helium is sprayed outside the device under test and the pressure differential across the device under test (atmosphere outside the device under test to vacuum) will pull helium through a leak path to the leak detector. Detection is improved by placing a bag over the device under test and spraying helium into the bag to increase the percentage of helium in the air surrounding the device. The leak detector reports a value of a leak rate based upon the amount of helium detected. It is a simple and effective method which produces a leak rate value. This method may or may not be able to detect the actual leak point.

Figure 1:
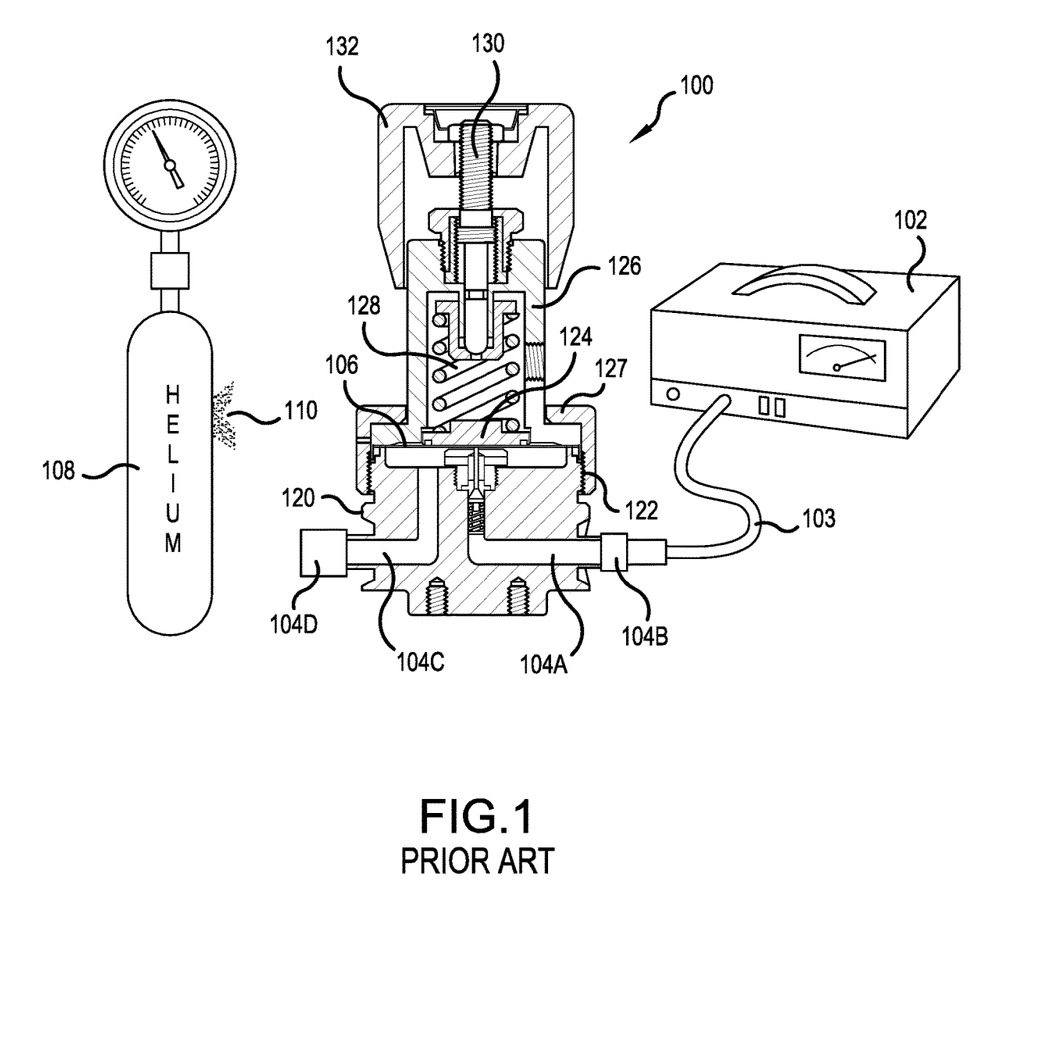
FIG. 1 is a schematic view of an inboard helium leak testing equipment according to the Prior Art.

As illustrated in FIG. 1, a device under test is a regulator 100 that includes a body 120 with an externally threaded portion 122. A sensing element 106, a round disc (a stamped metal part), is positioned on the top portion of the body 120. A cap 124 is positioned on top of the sensing element 106. The cap 124 is mounted relative to the body 120 by an upper housing 126 and a bonnet nut 127 that is internally threaded to mate with the externally threaded portion 122 to clamp and seal the sealing element 106 to sealing bead on the body 120. A knob wheel 132 is mounted on a screw thread 130 for adjusting the force of a spring 128 which adjusts outlet pressure. The body 120 includes an inlet conduit 104A and an outlet conduit 104C. The inlet conduit 104A is connected at 104B to a flexible hose 103 that is connected to a mass spectrometer 102. During testing, the outlet conduit 104C is capped off with a cap 104D and a vacuum is applied to an interior of the regulator 100. A supply of helium 108 provides a spray 110. If the regulator 100 has a leak, the helium 108 sprayed on the regulator 100 will be pulled by the vacuum within the regulator and through the inlet 104A to the flexible hose 103 to be supplied to the mass spectrometer 102. A leak is most likely to occur at the body 120 to diaphragm 106 seal.

Outboard Sniffer Probe Helium Leak Test

An outboard sniffer probe helium leak test is less common than the inboard leak test. The outboard sniffer probe test is basically the opposite of the inboard test where helium is applied inside the device under test rather than outside. In this case, the device under test is pressurized with helium and a vacuum wand (sniffer probe), is connected to the leak detector. The leak detector pulls atmospheric air from around the device under test through the wand to the leak detector. The limitation of this test method is the background reading of helium in the air which is nominally in the range of $10^{-5}$ atm cc/sec. However, the background level of helium in the air may vary. The test criteria is generally any rise above the background reading of helium in the air as the sniffer probe is placed near leak test ports, mechanical joints, welded joints, etc. is considered a leak. This method does not produce a leak rate value, per se. This method only detects that there is a rise in the atmospheric background level of helium but is able to detect a leak point.

A limitation to outboard sniffer probe testing is that a leak rate below the background level of helium in the air will not be detected. This test method is also operator dependent in that how the wand is held (positioned) relative to the device under test and how fast the wand is moved influences the detection.

Figure 2:
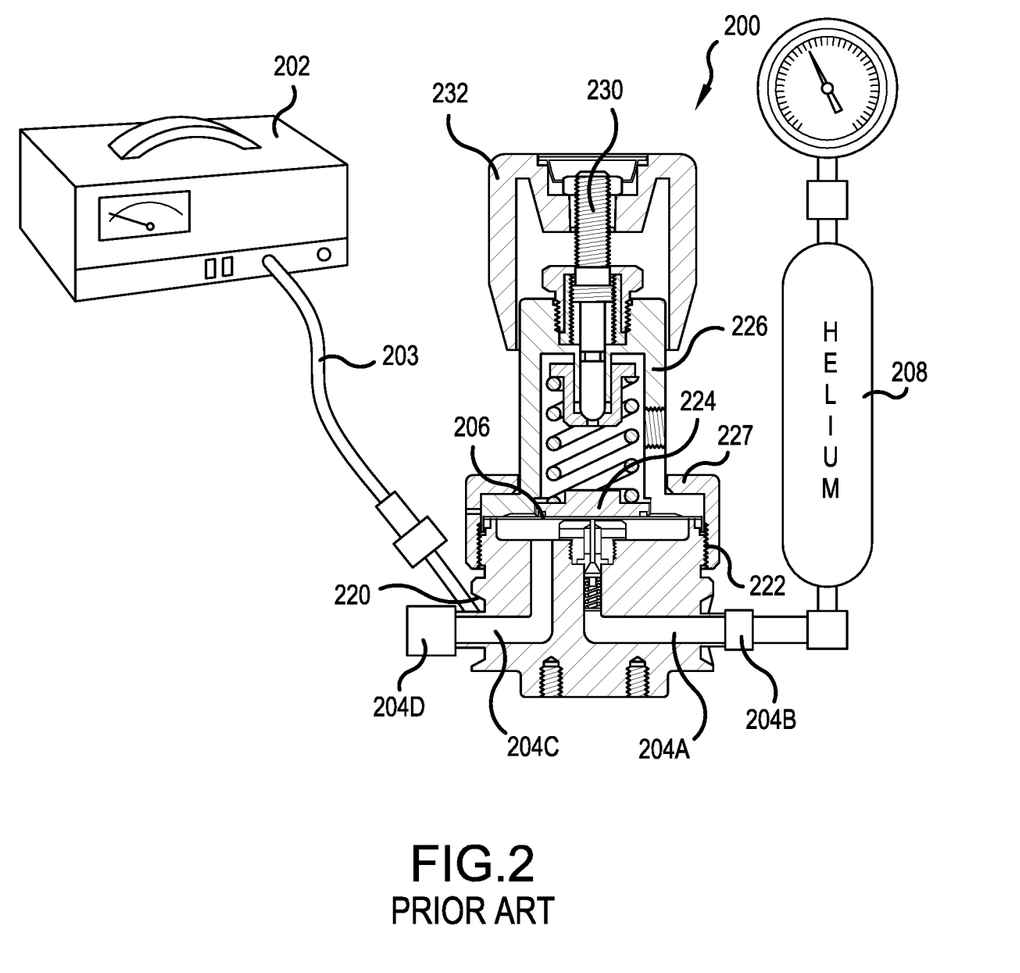
FIG. 2 is a schematic view of an outboard sniffer probe helium leak testing equipment according to the Prior Art.

As illustrated in FIG. 2, a device under test is a regulator 200 that includes a body 220 with an externally threaded portion 222. A sensing element 206, a round disc (a stamped metal part), is positioned on the top portion of the body 220. A cap 224 is positioned on top of the sensing element 206. The cap 224 is mounted relative to the body 220 by an upper housing 226 and a bonnet nut 227 that is internally threaded to mate with the externally threaded portion 222 to clamp and seal the sealing element 206 to sealing bead on the body 220. A knob wheel 232 is mounted on a screw thread 230 for adjusting the pressure of a spring 228. The body 220 includes an inlet conduit 204A and an outlet conduit 204C. The inlet conduit 204A is connected at 204B directly to a supply of helium 208. During testing, the outlet conduit 204C is capped off with a cap 204D and an interior portion of the regulator 200 is supplied with pressurized helium from the supply of helium 208. A sniffer probe 203 is manually moved to various exterior portions of the regulator 200. If the regulator 200 has a leak, the helium 208 within the interior of the regulator 200 will be pushed by the pressurized helium within the regulator 200 through a leak path and through the sniffer probe 203 to the mass spectrometer 202.

Outboard Bell Jar Helium Leak Test

The more stringent test is a helium outboard bell jar test. This test is very similar to the outboard sniffer probe test as the device under test is pressurized with helium. The difference is that the device under test is in a vacuum bell jar connected to the leak detector which eliminates the background helium in the environment surrounding the device under test. There are several disadvantages to the outboard helium bell jar method.

Using a chamber or jar to evacuate the outside of the device under test, does not disclose a leak point, only that a leak exists.

More specifically, the device under test:

1. needs to fit in a vacuum chamber which means testing large manifolds or gas piping systems is not practical; and 2. when this method detects a leak, the location of the leak is unknown and could simply be a test fitting connection, not the device actually leaking.

When using a device under test that is pressurized with helium and placed inside a vacuum chamber, after air is evacuated from the chamber, a mass spectrometer tuned to helium samples the inside of the chamber. If it detects helium, the device under test has a leak. The chamber is usually designed specifically for the device under test to minimize the amount of air that must be evacuated and thus minimize cycle time.

Figure 3:
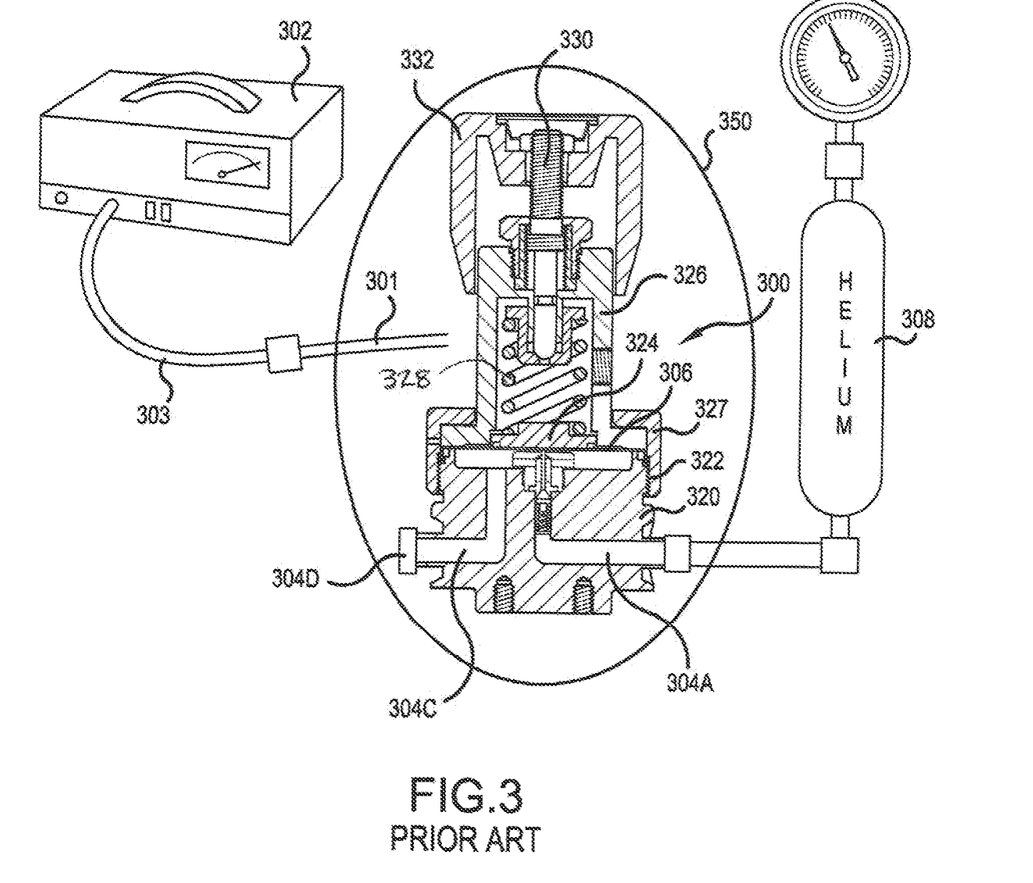
FIG. 3 is a schematic view of the more stringent helium outboard bell jar test equipment according to the Prior Art.

As illustrated in FIG. 3, a device under test is a regulator 300 that includes a body 320 with an externally threaded portion 322. A sensing element 306, a round disc (a stamped metal part), is positioned on the top portion of the body 320. A cap 324 is positioned on top of the sensing element 306. The cap 324 is mounted relative to the body 320 by an upper housing 326 and a bonnet nut 327 that is internally threaded to mate with the externally threaded portion 322 to clamp and seal the sensing element 306 to sealing bead on the body 320. A knob wheel 332 is mounted on a screw thread 330 for adjusting the pressure of a spring 328. The body 320 includes an inlet conduit 304A and an outlet conduit 304C. The inlet conduit 304A is connected directly to a supply of helium 308. During testing, the outlet conduit 304C is capped off with a cap 304D and an interior portion of the regulator 300 is supplied with pressurized helium from the supply of helium 308. A conduit 301 is connected to the flexible hose 303 that is connected to the mass spectrometer 302. If the regulator 300 has a leak, the helium 308 within the interior of the regulator 300 will be pushed by the pressurized helium within the regulator 300 through a leak path into the interior of the bell jar 350. The interior of the bell jar 350 is connected by the conduit 301 and the flexible hose 303 to the mass spectrometer 302.

In another variation of the helium outboard bell jar leak testing, it is possible to reverse the process. The chamber is pressurized with helium, and a vacuum is drawn on the inside of the assembly. In this case, the sensor looks for helium penetrating the assembly from the outside. Downsides to this method are that it uses a large volume of helium which is in scarce supply, cannot locate a leak point and device under test needs to fit in a chamber capable of being pressurized. Some term this method a "bombing" with helium.

Comparing Existing Leak Test Methods

Comparing and contrasting inboard to outboard testing, for the sake of simplicity, inboard is pulling molecules through a leak path with vacuum and a pressure differential of atmosphere to the vacuum level applied, a maximum differential of approximately 15 psig (~1 bar). For outboard testing, the device under test is pressurized with helium and the differential pressure is the difference between test helium pressure applied and atmosphere. In the case of a pressure regulator, the low pressure side is generally pressurized to the outlet rating of the device under test. The most common outlet range is 100 psig (7 bar), so the pressure differential in this case is more than 100 psi (7 bar), or more than seven times that of inboard testing. It is also important to note that outboard testing is stressing the parts the same as they would be in service and pushing the molecules through the leak path rather than trying to pull with a vacuum.

To complicate things further, leaks are pressure and time dependent. A leak might not be detected at one pressure though the leak may be detected at a higher pressure or might not be detected in 5 minutes but found in 30 minutes or some longer time period. These leak characteristics are affected by variables such as cross-sectional area and length of the leak path among other factors.

It is possible to have a device under test pass one test yet fail another. A device under test can pass an inboard test with a leak rate achieved of $1\times10^{-10}$ yet fail a sniffer probe test where leak detection is limited by the background level of helium in the air as previously explained. An individual might first think the inboard test was done incorrectly because the device under test failed a lower sensitivity sniffer probe test. In reality it is simply that different test methods and conditions, such as time and pressure, yield different results.

If an individual would rank leak test methods on sensitivity to finding leaks, inboard would be the least sensitive. Sniffer probe testing would be more sensitive as compared to inboard. A 24 hour nitrogen static pressure test is next with a helium outboard bell jar testing the best. However depending upon the test time and test gas pressure, a nitrogen static pressure test can be better than an outboard bell jar test. Further, some types of leaks, such as weld porosity or base material flaw, are more easily detected with inboard testing.

Another drawback to helium outboard testing is the helium itself. helium tends to permeate plastic materials, such as the regulator or valve seat material. The higher the pressure and longer the time, the more difficult it is to remove the helium that permeates (penetrates) into the seat material. An inboard test performed after an outboard test can (and often does) yield a false failure due to high residual helium from the previous test. Reducing pressure, time and helium percentage in test gas can each help reduce helium permeation at the expense of test sensitivity. For example, the lower the helium percentage from 100%, the less test sensitivity (meaning won't detect same level of leaks).

helium leak detectors are more sensitive and more expensive than air based test methods, thus helium leak detectors are reserved for the most critical assemblies. In the automotive industry they are used to test fuel rails, tire rims, oil coolers and air-conditioning components. In the appliance industry, they check gas lines and refrigerant coils. In the medical device industry, they test pacemakers and implantable infusion pumps.

Mass spectrometer technology can measure just about any size of leak, down to . . . $5\times10^{-12}$ atm-cc/sec.

Chamber methods can quantify the magnitude of the leak, but they cannot pinpoint its location. Sniffer probe methods can identify the source of the leak, but they cannot quantify how much the assembly is leaking.

The speed of the test depends on the size of the device under test and how much it will be pressurized, as well as the size of the vacuum chamber and how large a vacuum is pulled.

To prevent false positive tests, 0-rings and gaskets must be clean, smooth and free of tears or nicks. Like air-based leak testing, helium based leak testing requires attention to detail. Lapses in process control will lead to false positives, false negatives and frustration. Cleanliness is critical to accurate results. helium is extremely clingy, it will stick to dust particles. Compared with a helium molecule, a dust particle is very large.

If the instrument detects helium during a test, it may not necessarily mean the device under test is leaking. The helium could be coming from residual gas clinging to dirt or dust in the chamber. It is recommended that the work area should be cleaned regularly with distilled water and isopropyl alcohol.

Assemblers need to control the background level of helium in the test environment. helium is an ideal tracer gas for leak testing because it's relatively rare in the atmosphere. However, helium is present in the atmosphere at a concentration of 5 parts per million. System leaks or poor venting practices can cause the background level of helium to rise above 5 parts per million, which could lead to false positive tests.

If assemblers are not recovering and reusing the helium, the test gas should be vented outside the building so as to not increase background level of helium in the test area for testing. Pumps should be strategically located and maintained regularly. Vacuum lines should be leak-free.

In view of shrinking supplies and rising demand, the price of helium has risen sharply since 2007. As a result, assemblers are increasingly looking for ways to reduce helium costs. One way to do that is by using less helium in the test.

SUMMARY AND OBJECTS OF THE INVENTION

These and other objects of the present invention are achieved by providing a method for testing a device under test that includes the steps of:

applying a vacuum to an interior of the device under test;

externally applying helium under pressurize to a predetermined area (probable leak point) on the exterior of the device under test wherein said pressure applied during the external pressurization is higher as compared to the vacuum applied to the interior of the device under test to enable a utilization of a large pressure differential, while not leaving residual helium in a wetted area thus minimizing operator influence and interpretation; and detecting an existence or non-existence of a leak.

The method of the present invention may be applied to a regulator, a welding joint between two sections of piping, a threaded joint between two sections of piping or any other device, or piping system or other objects wherein it is necessary to detect a leak.

If the method is applied to a regulator, a sensing element would be positioned on a body of the regulator wherein the sensing element is held in place by a bonnet nut secured to the body of the regulator. The bonnet nut would include a leak test port and the pressurized helium would be applied to the leak test port in the bonnet nut to detect the existence of a leak or a non-leak of the diaphragm to body seal by supplying helium to the exterior of the regulator for detection by a mass spectrometer if a leak or a non-leak exists.

If the method is applied to welding between two sections of piping, a bonnet nut clamp fixture would be positioned in a gas tight arrangement over the welded joint between the two sections of piping. The fixture would include a leak test port and the pressurized helium would be applied to the leak test port to detect the existence of a leak or a non-leak in the weld joint by supplying helium to the exterior of the two welded sections of piping for leak detection by a mass spectrometer.

If the method is applied to a mechanical connection between two sections of piping, a clamping nut would be positioned in a gas tight arrangement over the joint between the two sections of piping. The clamp nut would include a leak test port and the pressurized helium would be applied to the leak test port in the bonnet nut to detect the existence of a leak or a non-leak at the seal between the two sections of pipe by supplying helium to the exterior of the two sections of piping for detection by a mass spectrometer if a leak or a non-leak exists.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present method places a vacuum on the interior of a device under test and only pressurizes a very small volume on a predetermined area on the outside of the device. Thus, the method according to the present invention uses very little helium. In addition, if the device under test leaks an individual will know where the leak is located. The present invention provides at least the following advantages:

1. use of a small volume of helium;
2. ability to determine the location of the leak; and
3. Testing of devices or joints in a large manifold or in configuration not suitable for vacuum bell jar.

It would be impossible in a prior art testing device to put an entire manifold or piping system in a pressure chamber. According to the method of the present invention, the device under test can be tested after installation. The prior art chamber method does not permit testing after installation. The equipment to test of the present invention may be installed in piping systems that can have hundreds of feet of tubing and many other devices positioned in the piping system. An individual would simply not be able to make a chamber to house an extensive piping system. The present method allows an individual to check the primary seal to atmosphere of the device under test wherever the device under test is installed. These are compelling and unique features of the method according to the present invention as compared to existing prior art.

The present method is used in applications where extremely small leaks can cause a process problem or injury. It is important that the device under test be leak tight and that an individual can verify the leak integrity. The method according to the present invention provides for testing that has better leak detection ability as compared to existing techniques employed today.

According to the present invention, a 3-5 minute outboard sniffer probe leak test was conducted as a standard practice on production regulators. Inboard leak tests and static nitrogen decay tests are optional. The purpose of this testing was to develop a better leak test method that is less influenced by an operator and by the environment. The method according to the present invention:

1. can easily discerned pass/fail criteria;
2. leaves no residual helium after the test, and
3. does a better job of testing to find leaks that are undetected by other test methods.

Basically, the testing method of the present invention has better leak detection than the standard inboard helium, outboard helium sniffer probe or nitrogen 24 hour static pressure testing.

Figure 4:
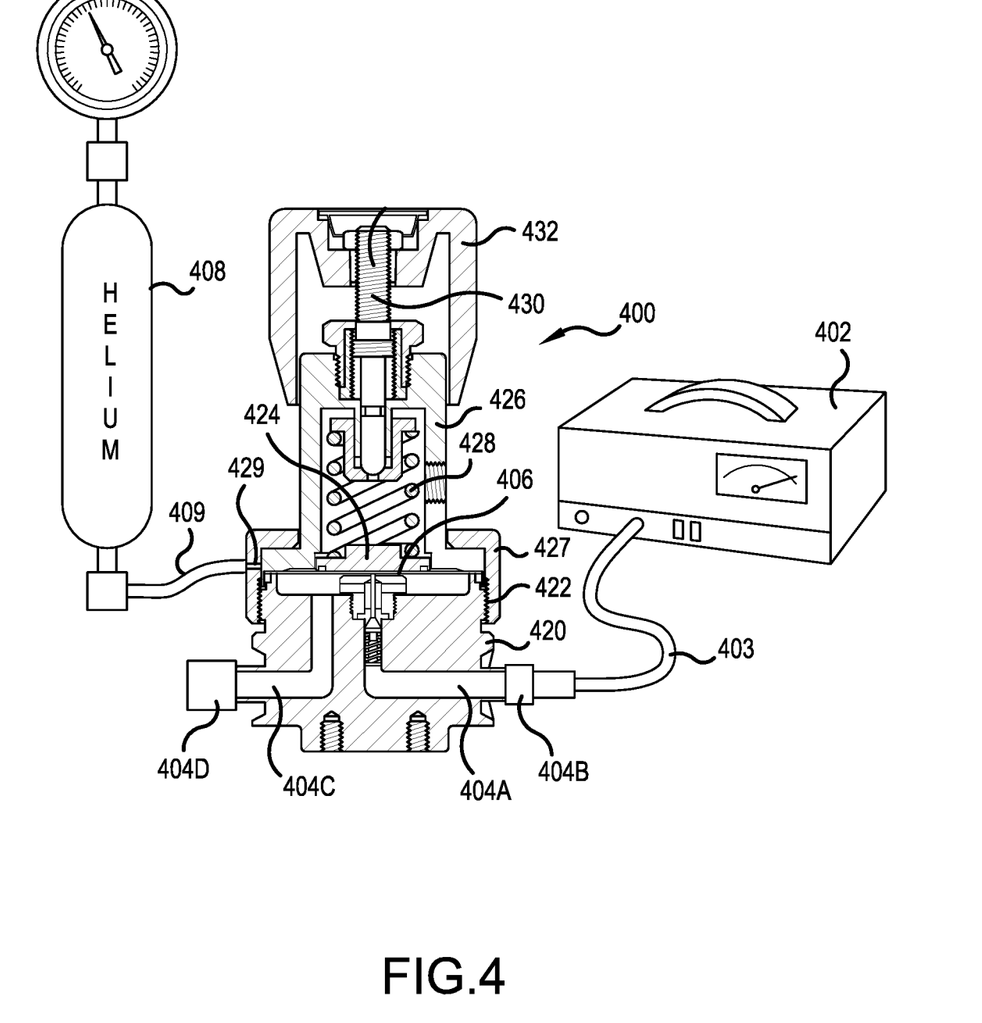
FIG. 4 is a schematic view of a method according to the present invention uses a vacuum applied to the interior of a regulator with a leak detector connected thereto while applying helium under pressure to a predetermined area on the outside of the regulator.

As illustrated in FIG. 4, a device under test is a regulator 400 that includes a body 420 with an externally threaded portion 422. A sensing element 406, a round disc (a stamped metal part), is positioned on the top portion of the body 420. A cap 424 is positioned on top of the sensing element 406. The cap 424 is mounted relative to the body 420 by an upper housing 426 and a bonnet nut 427 that is internally threaded to mate with the externally threaded portion 422 to clamp and seal the sealing element 406 to sealing bead on the body 420. A knob wheel 432 is mounted on a screw thread 430 for adjusting the pressure of a spring 428. The body 420 includes an inlet conduit 404A and an outlet conduit 404C. The bonnet nut 427 includes a leak test port 429 that is connected directly to a supply of helium 408. During testing, the outlet conduit 404C is capped off with a cap 404D. An interior portion of the regulator 400 is placed under a vacuum. Pressurized helium, from the supply of helium 408, is supplied through the conduit 409 to the leak test port 429 in the bonnet nut 427. The inlet conduit 404A is connected at 404B to a flexible hose 403 that is connected to the mass spectrometer 402. If the regulator 400 has a leak, helium 408 supplied to the leak test port 429 and into the interior of the regulator 400 will be pushed by the pressurized helium within the regulator 400 through a leak in the body 420 and pulled by the vacuum within the interior of the regulator 400 through the flexible hose 403 to the mass spectrometer 402 to detect the existence of a leak or a non-leak.

Figure 5:
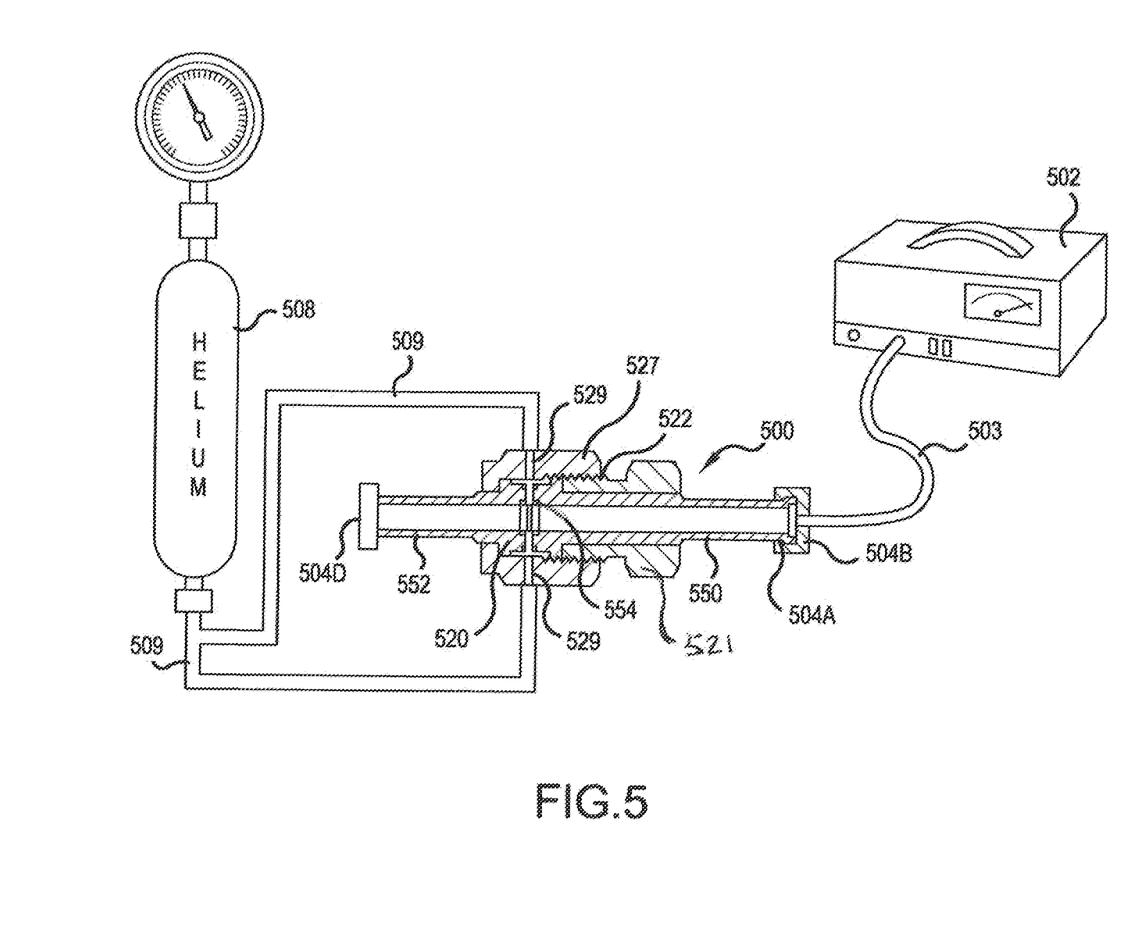
FIG. 5 is a schematic view of a method according to the present invention uses a vacuum applied to the interior of a mechanical joint piping system with a leak detector connected thereto while applying helium under pressure to a predetermined area on the outside of the threaded piping system.

As illustrated in FIG. 5, a device under test is a mechanical joint 500 to connect pipes that includes a first pipe section 550 that is connected to a second pipe section 552. The metal gasket seal 554 between the first pipe section 550 and the second pipe section 552 is tested for a leak by applying helium to the fitting nut 527 that is internally threaded to mate with the externally threaded portion 522 on the fitting 521. The first pipe section 550 includes an inlet 504A. The fitting nut 527 includes a leak test port 529 that is connected directly to a supply of helium 508. During testing, the second pipe section 552 is capped off with a cap 504D. An interior portion of the first pipe section 550 and the second pipe section 552 is placed under a vacuum. Pressurized helium, from the supply of helium 508, is supplied through the conduit 509 to the leak test port 529 in the fitting nut 527. The inlet 504A is connected at 504B to a flexible hose 503 that is connected to the mass spectrometer 502. If the mechanical joint fitting 500 has a leak, helium 508 supplied to the leak test port 529 and into the interior of the first pipe section 550 and the second pipe section 552 will be pushed by the pressurized helium through the weld 554 and into the first pipe section 550 and the second pipe section 552 through a leak in the weld 554 and pulled by the vacuum within the interior of the first pipe section 550 and the second pipe section 552 through the flexible hose 503 to the mass spectrometer 502 to detect the existence of a leak or a non-leak.

Figure 6:
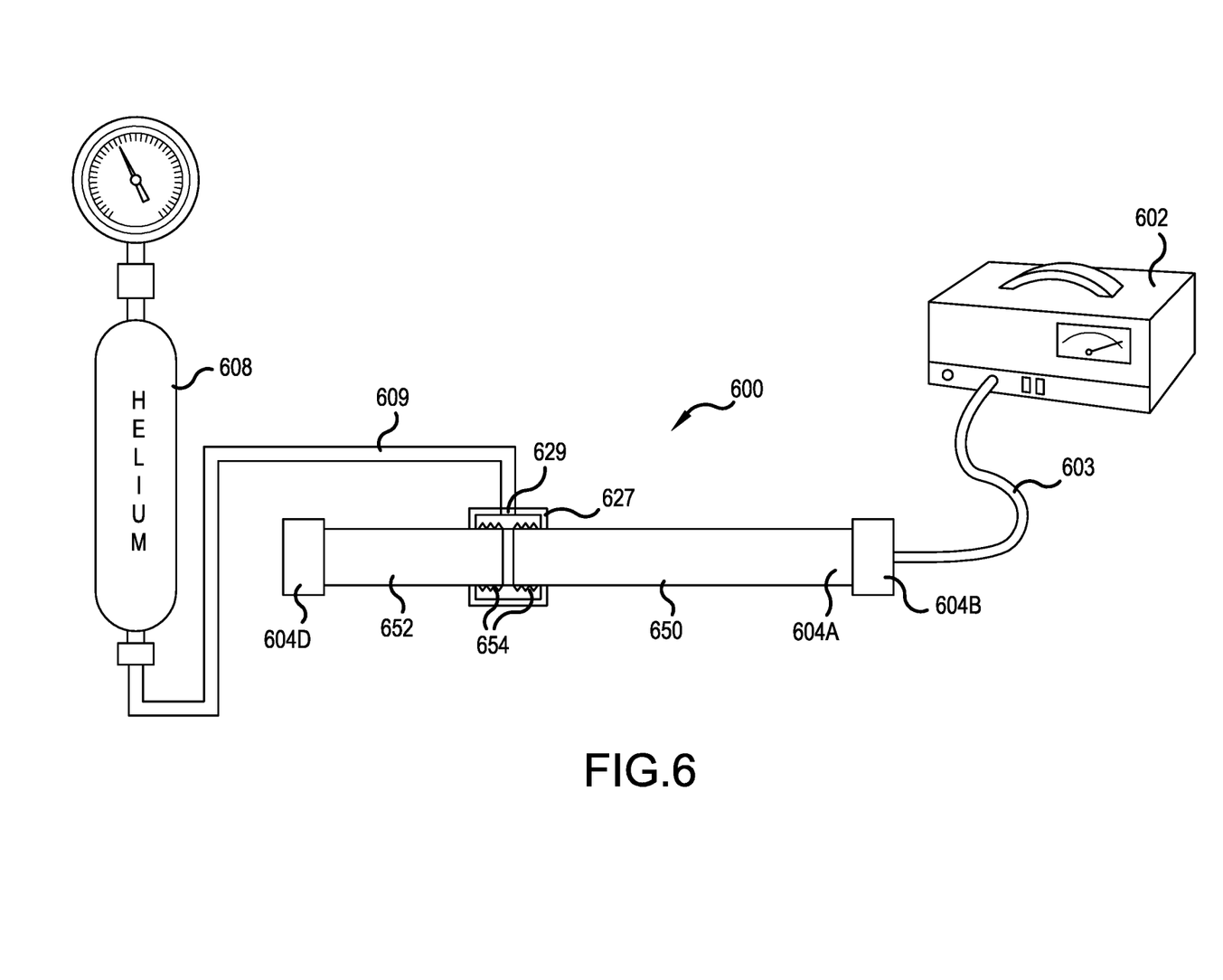
FIG. 6 is a schematic view of a method according to the present invention uses a vacuum applied to the interior of a welded joint piping system with a leak detector connected thereto while applying helium under pressure to a predetermined area on the outside of the welded piping system.

As illustrated in FIG. 6, a device under test is a welded pipe 600 that includes a first pipe section 650 that is welded to a second pipe section 652. The first pipe section 650 and the second pipe section 652 is tested for a weld leak by applying helium to the clamp test fixture 627 that clamps around and seals to pipes 650 and 652. The first pipe section 650 includes an inlet 604A. The clamp fixture 627 sealing to tubes 650 and 652 with seals 654 includes a leak test port 629 that is connected directly to a supply of helium 608. During testing, the second pipe section 652 is capped off with a cap 604D. An interior portion of the first pipe section 650 and the second pipe section 652 is placed under a vacuum. Pressurized helium, from the supply of helium 608, is supplied through the conduit 609 to the leak test port 629 in the test fixture 627. The inlet 604A is connected at 604B to a flexible hose 603 that is connected to the mass spectrometer 602. If the welded joint of the pipe 600 has a leak, helium 608 supplied to the leak test port 629 and into the interior of the first pipe section 650 and the second pipe section 652 will be pushed by the pressurized helium through the test fixture 627 and into the first pipe section 650 and the second pipe section 652 and pulled by the vacuum within the interior of the first pipe section 650 and the second pipe section 652 through the flexible hose 603 to the mass spectrometer 602 to detect the existence of a leak or a non-leak.

FIGS. 3-6 illustrate a description of applying pressurized helium to a predetermined portion on the exterior of a device under test while applying a vacuum to the interior of the device under test. It is to be understood, that the same test results would occur by reversing the arrangement of the pressurized helium and the vacuum wherein a vacuum would be applied to a predetermined portion on the exterior of the device under test while pressurized helium would be applied to the interior of the device under test. If the supply of the vacuum and the pressurized helium is reversed, the mass spectrometer would be attached to the side of the testing apparatus for detecting the existence of a leak or a non-leak.

According to the present invention, the solution resides in a new combination of inboard testing with pressurized helium applied to a predetermined portion of the outside of the device under test. A mechanical joint of a diaphragm seal is externally pressurized with helium rather than just spraying into the atmosphere around the device under test. The main advantage of an outboard leak test over the inboard leak test is the larger pressure differential. The new inboard leak test of the present invention enables the utilization of a large pressure differential, while not leaving residual helium in the wetted area and minimizing operator influence and interpretation.

A total of 45 AZ1210S and 55 AZ1010S AP Tech regulator models were assembled for leak testing. Although these regulators were selected for the test, the test results would apply to valves and other type devices with mechanical seals. Normal production failure rates are very low, so sealing surfaces of the devices under test were intentionally damaged to varying degrees to induce failures. Damage included diaphragms with various degrees of scratches, bonnet seals with scratches, dings, dents, and bonnet seals that were intentionally machined off center and at a slight angle.

The following leak tests were performed on each regulator:

Inboard—60 seconds
Pressurized Inboard (100 psig helium)—60 seconds
Static nitrogen Decay (100 psig nitrogen)—24 hours
Outboard Bell Jar (100 psig helium)—60 seconds Pressurized inboard is preceded by an inboard test to catch gross leaks without saturating the leak detector (meaning if a large leak is detected, pressurized inboard test was not performed). Cap holders were modified to add M5 threads to the existing leak test port holes for easy connections to pressurize the diaphragm to body seal externally. After completing the inboard test, with vacuum still applied to the wetted area, the bonnet seal is pressurized with 100 psig (7 bar) of helium for 60 seconds. Any rise in helium level after pressurization is considered a leak.

A pressurized inboard test setup was provided for an AZ1210 regulator. The test results from leak testing are summarized in Table 1 and Table 2. The test results for the AZ1210 regulators are detailed in Appendix Table A-1. The test results for the AZ1010 regulators are detailed in Appendix Table A-2.

TABLE 1

Summary of leak test results by category.

| Leak Test Results | Quantity |
| --- | --- |
| Total Regulators Tested | 100 |
| No Leaks Detected | 46 |
| Fail Inboard And/Or Pressurized Inboard | 51 |
| Fail Inboard And/Or Pressurized Inboard, Pass Decay and Outboard | 23 |
| Fail Inboard And/Or Pressurized Inboard, Pass Decay | 30 |
| Fail Inboard And/Or Pressurized Inboard, Pass Outboard | 29 |
| Fail Decay, Pass Inboard And/Or Pressurized Inboard | 1 |
| Fail Outboard, Pass Inboard And/Or Pressurized Inboard | 3 |

TABLE 2

Summary of leak test result cases.

| Quantity of DEVICE UNDER TESTs | Inboard | Pressurized Inboard | N2 Decay | Outboard Bell Jar |
| --- | --- | --- | --- | --- |
| 1 | Fail | Fail | Fail | Fail |
| 5 | Fail | N/A | Fail | Fail |
| 2 | Fail | N/A | Pass | Fail |
| 1 | Fail | Fail | Pass | Fail |
| 3 | Fail | Fail | Pass | Pass |
| 9 | Pass | Fail | Fail | Fail |
| 6 | Pass | Fail | Fail | Pass |
| 4 | Pass | Fail | Pass | Fail |
| 19 | Pass | Fail | Pass | Pass |
| 1 | Fail | Pass | Pass | Pass |
| 1 | Pass | Pass | Fail | Fail |
| 2 | Pass | Pass | Pass | Fail |
| 46 | Pass | Pass | Pass | Pass |

CONCLUSION

A total of 100 regulators were evaluated for leak integrity. Though an attempt was made to induce diaphragm to body seal damage, 46 of the regulators passed all leak tests performed. Leaks were identified on 51 of the 54 leaking regulators using either inboard or pressurized inboard tests. Inboard tests alone identified leaks in 13 regulators. Pressurized inboard tests identified leaks in 43 regulators (if detected by previous inboard test pressurized inboard test not performed). Static decay tests identified leaks in 22 regulators. Outboard bell jar tests identified leaks in 25 regulators.

Of the 51 failures detected using inboard and/or pressurized inboard tests, 30 devices under test passed the static decay test, and 29 device under test passed the outboard bell jar test, indicating that the combination of inboard and pressurized inboard testing does a better job of identifying leaks than the static decay and outboard bell jar tests. But as discussed earlier, different leak test methods can identify different leaks, and 3 devices under test failed the outboard bell jar test while passing inboard and pressurized inboard. One of those devices under test also failed the static decay test. All test methods have limitations and may not detect 100% of leaks. However, the combination of inboard and pressurized inboard was able to detect more leaks than any other test method.

The conclusion is that the combination of inboard and pressurized inboard test methods is a superior way to detect leaks in UHP gas handling devices than static decay or outboard bell jar tests.

TABLE A-1

Leak test results for AZ1210 regulators.

| Regulator | Inboard | Pressurized Inboard | N2 Decay | Outboard Bell Jar |
| --- | --- | --- | --- | --- |
| AZ1210 #98 | Fail | Fail | Fail | Fail |
| AZ1210 #99 | Fail | Fail | Pass | Fail |
| AZ1210 #52 | Fail | Fail | Pass | Pass |
| AZ1210 #56 | Fail | N/A | Fail | Fail |
| AZ1210 #57 | Fail | N/A | Fail | Fail |
| AZ1210 #43 | Fail | Pass | Pass | Pass |
| AZ1210 #46 | Pass | Fail | Fail | Fail |
| AZ1210 #54 | Pass | Fail | Fail | Fail |
| AZ1210 #59 | Pass | Fail | Fail | Fail |
| AZ1210 #62 | Pass | Fail | Fail | Fail |
| AZ1210 #88 | Pass | Fail | Fail | Fail |
| AZ1210 #93 | Pass | Fail | Fail | Fail |
| AZ1210 #96 | Pass | Fail | Fail | Fail |
| AZ1210 #55 | Pass | Fail | Fail | Pass |
| AZ1210 #60 | Pass | Fail | Fail | Pass |
| AZ1210 #89 | Pass | Fail | Pass | Fail |
| AZ1210 #94 | Pass | Fail | Pass | Fail |
| AZ1210 #95 | Pass | Fail | Pass | Fail |
| AZ1210 #50 | Pass | Fail | Pass | Pass |
| AZ1210 #53 | Pass | Fail | Pass | Pass |

TABLE A-1-continued

Leak test results for AZ1210 regulators.

| Regulator | Inboard | Pressurized Inboard | N2 Decay | Outboard Bell Jar |
|---|---|---|---|---|
| AZ1210 #63 | Pass | Fail | Pass | Pass |
| AZ1210 #86 | Pass | Fail | Pass | Pass |
| AZ1210 #87 | Pass | Fail | Pass | Pass |
| AZ1210 #90 | Pass | Fail | Pass | Pass |
| AZ1210 #92 | Pass | Fail | Pass | Pass |
| AZ1210 #97 | Pass | Fail | Pass | Pass |
| AZ1210 #84 | Pass | Pass | Fail | Fail |
| AZ1210 #45 | Pass | Pass | Pass | Fail |
| AZ1210 #39 | Pass | Pass | Pass | Pass |
| AZ1210 #40 | Pass | Pass | Pass | Pass |
| AZ1210 #41 | Pass | Pass | Pass | Pass |
| AZ1210 #42 | Pass | Pass | Pass | Pass |
| AZ1210 #44 | Pass | Pass | Pass | Pass |
| AZ1210 #47 | Pass | Pass | Pass | Pass |
| AZ1210 #48 | Pass | Pass | Pass | Pass |
| AZ1210 #49 | Pass | Pass | Pass | Pass |
| AZ1210 #51 | Pass | Pass | Pass | Pass |
| AZ1210 #58 | Pass | Pass | Pass | Pass |
| AZ1210 #61 | Pass | Pass | Pass | Pass |
| AZ1210 #64 | Pass | Pass | Pass | Pass |
| AZ1210 #65 | Pass | Pass | Pass | Pass |
| AZ1210 #83 | Pass | Pass | Pass | Pass |
| AZ1210 #85 | Pass | Pass | Pass | Pass |
| AZ1210 #91 | Pass | Pass | Pass | Pass |
| AZ1210 #100 | Pass | Pass | Pass | Pass |

TABLE A-2

Leak test results for AZ1010 regulators.

| Regulator | Inboard | Pressurized Inboard | N2 Decay | Outboard Bell Jar |
|---|---|---|---|---|
| AZ1010 #38 | Fail | Fail | Pass | Pass |
| AZ1010 #79 | Fail | Fail | Pass | Pass |
| AZ1010 #11 | Fail | N/A | Fail | Fail |
| AZ1010 #19 | Fail | N/A | Fail | Fail |
| AZ1010 #20 | Fail | N/A | Fail | Fail |
| AZ1010 #16 | Fail | N/A | Pass | Fail |
| AZ1010 #18 | Fail | N/A | Pass | Fail |
| AZ1010 #35 | Pass | Fail | Fail | Fail |
| AZ1010 #82 | Pass | Fail | Fail | Fail |
| AZ1010 #9 | Pass | Fail | Fail | Pass |
| AZ1010 #23 | Pass | Fail | Fail | Pass |
| AZ1010 #26 | Pass | Fail | Fail | Pass |
| AZ1010 #28 | Pass | Fail | Fail | Pass |
| AZ1010 #75 | Pass | Fail | Pass | Fail |
| AZ1010 #13 | Pass | Fail | Pass | Pass |
| AZ1010 #15 | Pass | Fail | Pass | Pass |
| AZ1010 #22 | Pass | Fail | Pass | Pass |
| AZ1010 #27 | Pass | Fail | Pass | Pass |
| AZ1010 #29 | Pass | Fail | Pass | Pass |
| AZ1010 #30 | Pass | Fail | Pass | Pass |
| AZ1010 #31 | Pass | Fail | Pass | Pass |
| AZ1010 #72 | Pass | Fail | Pass | Pass |
| AZ1010 #73 | Pass | Fail | Pass | Pass |
| AZ1010 #74 | Pass | Fail | Pass | Pass |
| AZ1010 #77 | Pass | Fail | Pass | Pass |
| AZ1010 #67 | Pass | Pass | Pass | Fail |
| AZ1010 #1 | Pass | Pass | Pass | Pass |
| AZ1010 #2 | Pass | Pass | Pass | Pass |
| AZ1010 #3 | Pass | Pass | Pass | Pass |
| AZ1010 #4 | Pass | Pass | Pass | Pass |
| AZ1010 #5 | Pass | Pass | Pass | Pass |
| AZ1010 #6 | Pass | Pass | Pass | Pass |
| AZ1010 #7 | Pass | Pass | Pass | Pass |
| AZ1010 #8 | Pass | Pass | Pass | Pass |
| AZ1010 #10 | Pass | Pass | Pass | Pass |
| AZ1010 #12 | Pass | Pass | Pass | Pass |
| AZ1010 #14 | Pass | Pass | Pass | Pass |
| AZ1010 #17 | Pass | Pass | Pass | Pass |
| AZ1010 #21 | Pass | Pass | Pass | Pass |
| AZ1010 #24 | Pass | Pass | Pass | Pass |
| AZ1010 #25 | Pass | Pass | Pass | Pass |
| AZ1010 #32 | Pass | Pass | Pass | Pass |
| AZ1010 #33 | Pass | Pass | Pass | Pass |
| AZ1010 #34 | Pass | Pass | Pass | Pass |
| AZ1010 #36 | Pass | Pass | Pass | Pass |
| AZ1010 #37 | Pass | Pass | Pass | Pass |
| AZ1010 #66 | Pass | Pass | Pass | Pass |
| AZ1010 #68 | Pass | Pass | Pass | Pass |
| AZ1010 #69 | Pass | Pass | Pass | Pass |
| AZ1010 #70 | Pass | Pass | Pass | Pass |
| AZ1010 #71 | Pass | Pass | Pass | Pass |
| AZ1010 #76 | Pass | Pass | Pass | Pass |
| AZ1010 #78 | Pass | Pass | Pass | Pass |
| AZ1010 #80 | Pass | Pass | Pass | Pass |
| AZ1010 #81 | Pass | Pass | Pass | Pass |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for testing a device under test comprising the following steps:
    surrounding a predetermined area of an exterior of the device under test with a gas tight housing;
    applying a vacuum to an interior of the device under test positioned within said gas tight housing;
    externally applying helium under pressure to said predetermined area on the exterior of the device under test within said gas tight housing wherein said pressure applied during the external pressurization is 100 psig as the vacuum is applied to the interior of the device under test to enable a utilization of a pressure differential, while not leaving residual helium in a wetted area thus minimizing operator influence and interpretation;
    said device under test is a regulator;
    a sensing element positioned on a body of the regulator wherein the sensing element is held in place by a bonnet nut secured to the body of the regulator and wherein the bonnet nut includes a leak test port and the pressurized helium is applied to the leak test port in the bonnet nut;
    detecting an existence of a leak or a non-existence of a leak in the predetermined area of the exterior of the regulator under test within said gas tight housing by supplying helium to the exterior of the regulator for detecting by a mass spectrometer the existence of the leak or the non-existence of the leak.

2. A method for testing a device under test comprising the following steps:
    surrounding a predetermined area of an exterior of the device under test with a gas tight housing; applying a vacuum to an interior of the device under test;
    externally applying helium under pressure to the predetermined area on the exterior of the device under test within said gas tight housing;
    applying helium under pressure of 100 psig on the exterior of the device under test within said gas tight housing as the vacuum is applied to the interior of the device under test;

utilizing a regulator as the device under test;
utilizing a sensing element positioned on a body of the regulator wherein the sensing element is held in place by a bonnet nut secured to the body of the regulator wherein the bonnet nut includes a leak test port and the pressurized helium is applied to the leak test port in the bonnet nut to detect an existence of a leak or a non-existence of a leak;
utilizing a pressure differential on the exterior of the regulator under test within said gas tight housing as the vacuum is applied to the interior of the regulator under test for detecting the existence of the leak or the non-existence of the leak in the predetermined area of the exterior of the regulator under test within said gas tight housing by a mass spectrometer; and
leaving no residual helium in a wetted area of the regulator under test within said gas tight housing.

* * * * *